Figure 1:
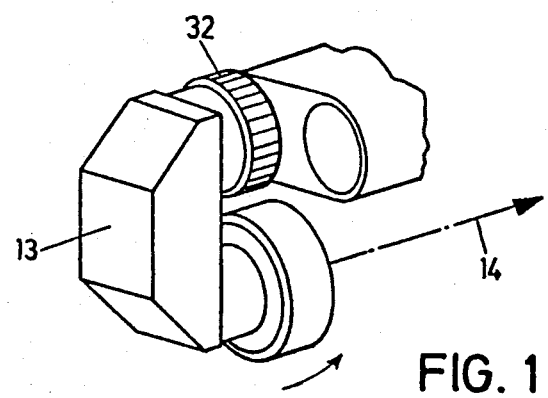

United States Patent [19]

Steiner

[11] Patent Number: 4,630,900

[45] Date of Patent: Dec. 23, 1986

[54] SYSTEM FOR INTRODUCING BY REFLECTION ADDITIONAL INFORMATION INTO BINOCULARS

[76] Inventor: Carl Steiner, Dr.-Hans-Frisch-Str. 9, D-8580 Bayreuth, Fed. Rep. of Germany

[21] Appl. No.: 686,259

[22] PCT Filed: Apr. 5, 1984

[86] PCT No.: PCT/DE84/00079
§ 371 Date: Dec. 6, 1984
§ 102(e) Date: Dec. 6, 1984

[87] PCT Pub. No.: WO84/04177
PCT Pub. Date: Oct. 25, 1984

[30] Foreign Application Priority Data

Apr. 8, 1983 [DE] Fed. Rep. of Germany ... 8310763[U]
May 9, 1983 [DE] Fed. Rep. of Germany ... 8314105[U]

[51] Int. Cl.⁴ .......................................... G02B 23/02
[52] U.S. Cl. ................................. 350/539; 350/174
[58] Field of Search ............... 350/174, 254, 422, 539, 350/541, 565, 566, 569, 576

[56] References Cited

U.S. PATENT DOCUMENTS 2,937,559 5/1960 Shute et al. ........................ 350/174
3,002,418 10/1961 Mitchell ............................. 350/174
3,049,972 8/1962 Malinowski ....................... 350/569
3,865,468 2/1975 Holcomb ........................... 350/422

FOREIGN PATENT DOCUMENTS 1952960 4/1970 Fed. Rep. of Germany .
2063527 7/1971 Fed. Rep. of Germany .
2501178 7/1976 Fed. Rep. of Germany .
7907058 6/1979 Fed. Rep. of Germany .
2319914 2/1977 France .
464562 12/1968 Switzerland .
24814 of 1911 United Kingdom .
406336 3/1934 United Kingdom .

OTHER PUBLICATIONS

Optical Engineering, Nov./Dec., 1974, *Pechan Derotation Prism-Application and Alignment Notes,* by B. H. Walker, vol. 13-No. 6, G233-4.

Primary Examiner—John K. Corbin
Assistant Examiner—V. J. Lemmo
Attorney, Agent, or Firm—Collard, Roe & Galgano

[57] ABSTRACT

A system for superimposing additional information on the optical path of a telescope or binoculars is provided wherein the additional information is in the form of a slide or film strip containing a map sector and angle information which is out of the optical path. An arm containing optical elements can be swung into and out of the optical path to transmit the image contained on the slide or film strip to the optical path as desired. Rotation of the image can be achieved either by means of a thumb wheel connected to the slide holder whereby the slide itself can be rotated or by rotation of an optical prism assembly forming part of the optical elements in the arm.

8 Claims, 2 Drawing Figures

SYSTEM FOR INTRODUCING BY REFLECTION ADDITIONAL INFORMATION INTO BINOCULARS

The invention relates to a system for introducing by reflection additional information into the optical path of a telescope or binoculars.

Such a system for introducing by reflection additional information in the optical path of binoculars is known from GB-PS No. 406336. This known system includes a set of prisms deflecting the image-forming rays associated with the additional information and introducing said rays by reflection in the optical path of the binoculars. Furthermore, this known system includes a lighting arrangement for the information carrier.

Furthermore, binoculars with a compass attached to the top side of said binoculars are known from German utility Pat. No. 7907058, said compass containing a rotating graduated dial instead of the commonly used compass needle, whereby said graduated dial consists of transparent or translucent material at least within the outer zone of the dial. The image of said graduated dial is incorporated in the optical path of the binoculars with the help of a special optical system. In this way, the user of the binoculars is simultaneously provided with information on the direction in which he is viewing. In many cases, however, it is desired to additionally incorporate specifically associated map sectors with correct positioning.

Therefore, the primary object of the invention is to provide a device for introducing by reflection correctly oriented map sectors into the optical path of a telescope or binoculars.

This object is accomplished according to the present invention by the provision of a system for incorporating information regarding direction in the optical path of a telescope or binoculars, wherein the information is contained on a slide or film strip outside the optical path of the telescope or binoculars, the slide or film strip containing a map sector with angle information, comprising means for illuminating the slide or film strip from behind, an arm containing optical elements for adapting the path of the image rays of the information to the optical path of the telescope, the arm being movable between a first position in which an image of the slide or film strip is superimposed on the optical path of the telescope and a second position in which said image is removed from said optical path, and means for rotating said image. Image rotation may be accomplished by rotating the slide or film strip itself using a thumb wheel of by rotating a prism forming part of the optical elements contained in the arm using another thumb wheel.

Other objects and features of the present invention will become apparent from the following detailed description considered in connection with the accompanying drawing. It is to be understood, however, that the drawing is designed as an illustration only and not as a definition of the limits of the invention.

Figure 2:
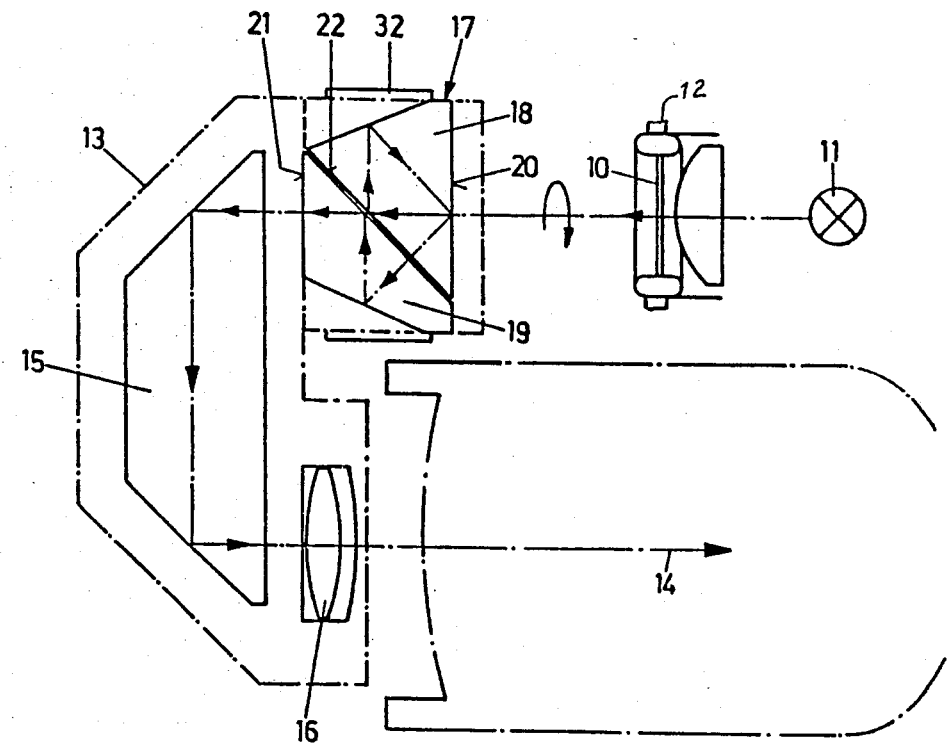

In the drawing wherein similar reference characters denote similar elements throughout the several views:

FIG. 1 is a perspective view of an auxiliary device mounted on a telescope having a pivotable arm which may be pivoted into the optical path of the telescope; and FIG. 2 is a diagrammatic view showing details of the optical system employed in the auxiliary device shown in FIG. 1.

In certain situations such as, for example, when sailing or flying, it is very difficult or almost impossible to use maps in the normal manner. In such cases, a telescope or binoculars, as shown in the drawing, including a sector of the map contained on a slide or film strip 10 is helpful, said slide or film being illuminated from the back side by means of a lighting system 11. In addition, the slide or film strip 10 with the map sector also contains angle information from which it is possible to take a reading of the associated points of the compass. As described in greater detail below, a prism assembly 17 can be rotated by means of a thumb wheel 32, permitting the viewer to orient the map sector to the direction of viewing, if need be also via a compass introduced by reflection. Alternatively, slide 10 can be rotated by means of a thumb wheel 12 so as to orient the map sector properly. It should be noted that only a single image rotating means is required in a particular embodiment and therefore normally only prism assembly 17 would be rotatable or only slide 10 would be rotatable.

Since it would not be desirable in many cases if such map sectors were always incorporated in the field of view, the map sector contained on the slide or film strip 10 is incorporated by means of an arm 13 capable of being pivoted into the optical path of the telescope or binoculars and out of the field of view when no viewing of the map slide 10 is desired. In the latter condition, the telescope or binoculars may be used as a normal instrument. The arm 13 may be arrested in the different positions, for example, by form-locking or force fit detent means.

The deflection of the image rays of the map slide or film strip 10 is achieved by means of a deflecting prism 15 incorporated into pivoting arm 13, said prism having a trapezoidal shape in the longitudinal view. A lens system 16 is provided at the reflection or exit side of pivoting arm 13, i.e., adjacent to the deflecting prism 15, from where the slide 10 is imaged to infinity and incorporated in the optical path 14 of the telescope or binoculars.

Furthermore, in order to obtain the smallest possible design length and at the same time permit optical rotation of the map sector, a Pechan prism assembly 17 consisting of two prisms 18 and 19 is mounted ahead of the deflecting prism 15. Of course, other prisms that are similar to the Pechan prism may be used. In the event slide 10 is to be rotated mechanically, the Pechan prism or similar prism may be dispensed with.

The image rays from the slide or film strip 10 pass substantially perpendicularly through the incidence plane 20 extending perpendicular to the optical axis, are deflected perpendicular to the optical axis on a line of separation 22 defining an air gap between the two prisms 18 and 19, said line being substantially inclined by 45° to the optical axis, and, after a number of deflections, the image rays pass substantially vertically through the line of separation 22 between the two prisms 18 and 19. Following several deflections within the second prism 19, the image rays exit from the prism assembly 17 via a reflecting plane 21 extending perpendicular to the optical axis, and from there enter the deflecting prism 15 having lens system 16 arranged on its exit side.

By rotating the prism assembly 17 or the slide 10 itself around the optical axis, the image of the map sector incorporated in the optical path is rotated for the viewer.

If incorporation of the map sector is desired, pivoting arm 13 is first pivoted into optical path 14 of the telescope or binoculars and arrested in said position. The viewer may then establish the sighting direction either with the help of the known incorporated graduated dial of a built-in compass or with the help of other known means.

Next, the map sector image is rotated for the viewer by means of the thumb wheel 32 in a way such that said sector appears in the field of view of the user with the correct orientation, which can be verified with the help of the angle information of the map sector. Once this has been achieved, the sighting direction and alignment of the map sector will coincide. In this way, the user of the telescope or binoculars is provided with a direct association between the map sector and sighting direction, which substantially facilitates the user's orientation.

Alternately, as indicated above, the map sector image can be rotated by rotating the film strip or slide 10 by means of thumb wheel 12.

It should also be pointed out, although obvious from the above description, that the device incorporating the described system can be adapted for use with either a telescope or binoculars since binoculars are merely two telescopes joined sidewise.

The troublesome opening of maps, which is a problem particularly with unfavorable wind conditions, is eliminated.

While only two embodiments of the present invention have been shown and described, it will be obvious that many changes and modifications may be made thereunto without departing from the spirit and scope of the invention.

What is claimed is:

1. A device for selectively incorporating additional information in the optical path of binoculars in the form of a slide or film strip outside the optical path of the binoculars, the slide or film strip containing a map sector with angle information, said device comprising:
   (a) means for illuminating the slide or film strip from behind so as to establish image rays thereof;
   (b) means for rotating said slide or film strip so as to rotate the image rays of the additional information;
   (c) an arm including a prism arrangement and lens system, said prism arrangement and lens system adapting the path of the image rays of the additional information to the optical path of the binoculars; and
   (d) means for pivotably moving said arm between a first position in which the image rays of the additional information are superimposed on the optical path of the binoculars and a second position in which said image rays are removed from said optical path.

2. The device according to claim 1, wherein said means for rotating said slide or film strip includes a thumb wheel for effecting said rotation.

3. A device for selectively incorporating additional information in the optical path of binoculars in the form of a slide or film strip outside the optical path of the binoculars, the slide or film strip containing a map sector with angle information, said device comprising:
   (a) means for illuminating the slide or film strip from behind so as to establish image rays thereof;
   (b) a rotatable prism assembly rotatable by means of a thumb wheel for rotating the image rays of the additional information;
   (c) an arm including a prism arrangement and lens system, said prism arrangement and lens system adapting the path of the image rays of the additional information to the optical path of the binoculars; and
   (d) means for pivotably moving said arm between a first position in which the image rays of the additional information are superimposed on the optical path of the binoculars and a second position in which said image rays are removed from said optical path.

4. The device according to claim 3, wherein said prism arrangement is a trapezoidal deflection prism that is trapezoidal in longitudinal section and said lens system is adjacent to said trapezoidal deflection prism in the direction of exit.

5. The device according to claim 4, wherein said rotatable prism assembly is at the entrance side of the deflection prism in said arm and provides for repeated deflection which has incidence and reflective planes which are perpendicular to the optical axis.

6. The device according to claim 5, wherein said prism assembly comprises two prisms, the line of separation between which is inclined substantially at an angle of 45° relative to the optical axis and defines an air gap between the prisms.

7. The device according to claim 6, wherein image rays that enter the prism assembly are deflected after entering a first prism of the two prisms on the line of separation perpendicular to the optical axis, and after subsequent deflections pass at right angles through the line of separation to the second prism of the two prisms where they are again deflected repeatedly, finally passing through an exit plane in the direction of the optical axis.

8. The system according to claim 3, wherein the pivotal movement of said arm is in a plane perpendicular to the optical axis.

* * * * *